Figure 1:
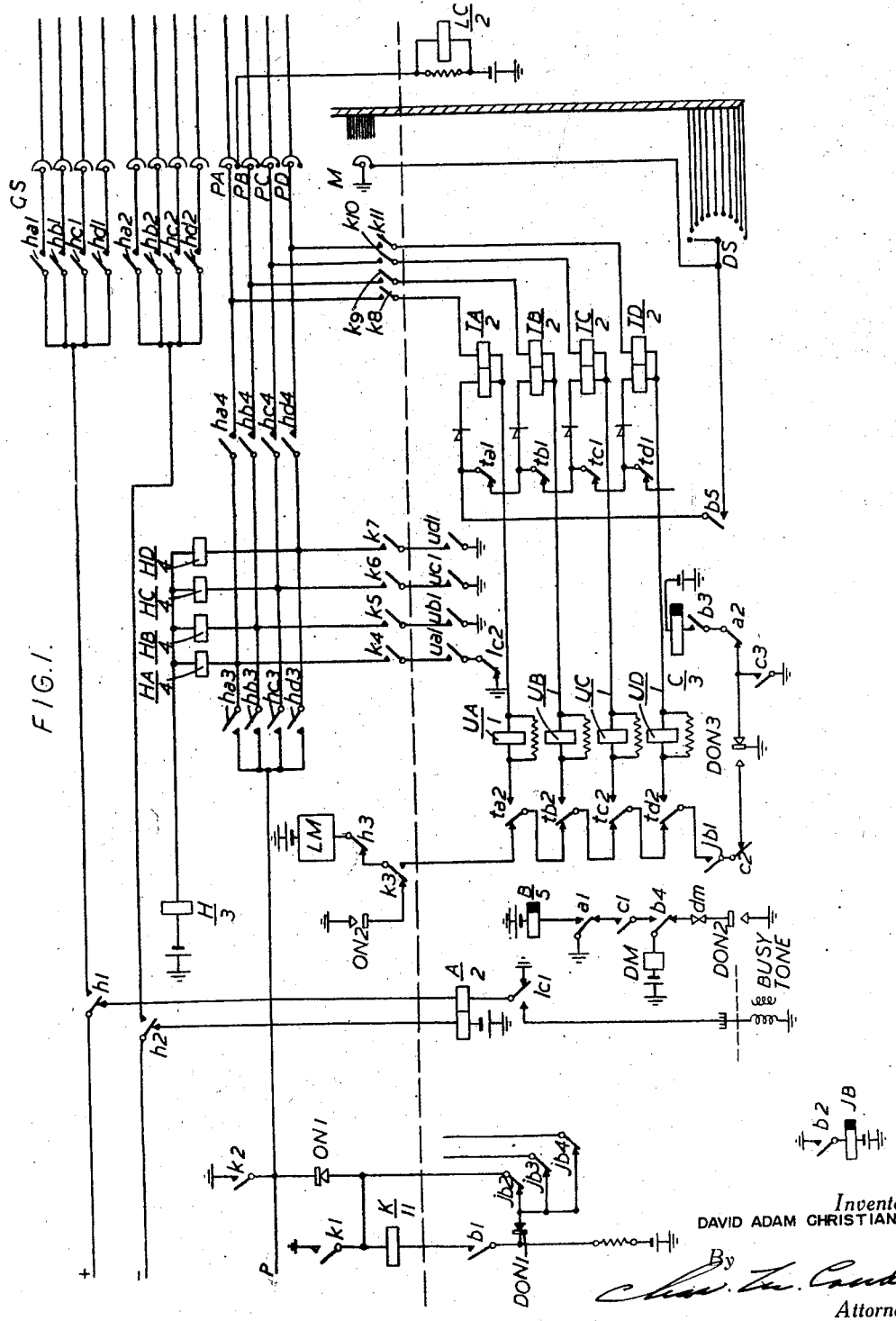

Feb. 18, 1947. D. A. CHRISTIAN 2,416,086
AUTOMATIC SELECTING SWITCH
Filed Jan. 8, 1945 3 Sheets-Sheet 3

FIG.3.

Inventor
DAVID ADAM CHRISTIAN
By
Attorney

Patented Feb. 18, 1947

2,416,086

UNITED STATES PATENT OFFICE 2,416,086

AUTOMATIC SELECTING SWITCH

David Adam Christian, Batley, England, assignor to Siemens Brothers & Co. Limited, London, England, a British company Application January 8, 1945, Serial No. 571,735
In Great Britain January 12, 1944

6 Claims. (Cl. 179—18)

This invention relates to electric selective signalling systems and more particularly to the testing of outlets from selecting switches in such systems. The invention is particularly applicable to the testing of outlets connected to a switch such as a group selector in an automatic telephone system which is required to search for a free or marked outlet in a group of outlets and has for its object improved arrangements which permit of a number of outlets being tested simultaneously. By such means the capacity of a switch may be increased without increasing the searching time, which, in a group selector in an automatic telephone system, is limited by the maximum permissible duration of what is known as the inter-train pause. The invention has in view arrangements permitting of the simultaneous testing of any number of outlets within the practical dimensions of the selecting switch.

In the present invention as many test relays are provided as there are outlets to be tested simultaneously, each test relay for the purpose of test being connected to a test wiper and all the test relays being connected to the several test wipers at the same time. The relays are so connected that the outlets for any multiple test are given an order of preference. To this end it is arranged that a relay early in the order of preference disables the operating circuit for relays later in the order. It is also further arranged that once a test relay commences to operate an earlier choice of outlet can only be taken into use if the associated test relay operates soon enough to prevent the later choice relay closing its locking circuit. Once a locking circuit for a later choice test relay has been closed the operation of an earlier choice test relay will be ineffective in seizing its outlet. The order of preference is provided by connecting the operating circuits of the test relays to a chain of contacts of these relays in which break contacts of earlier choice relays are included in the circuit for later choice relays but not vice versa. A test relay when operated is locked and the completion of its locking circuit busies the outlet, and non-interference with the locking circuit by the operation of an earlier test relay is secured by arranging that the locking circuits are dependent on a further contact chain of the test relays with the contacts arranged in the reverse order. Thus the locking circuit for the earlier choice relays is dependent on the non-operation of later choice relays but not vice versa. In this manner what amounts to a race between test relays with possible confusion is avoided and it is always assured that the earliest choice outlet that is free up to the moment a locking circuit is closed is taken into use. The test relays are preferably of the high speed type and auxiliary relays may be provided to carry out functions that the test relays may be unable to perform due to the limited number of contacts available. These auxiliary relays may be connected to the said further contact chain and may control locking circuits for the test relays and themselves or they may be included in the locking circuits for the test relays. When operated, an auxiliary relay may bring about the operation of the appropriate switching relay. By the provisions of the arrangements described double connections are avoided since only one auxiliary relay and consequently only one switching relay are operated whatever the circumstances be, provided that there is at least one free and available outlet in the plurality tested at the same time and the arrangement of the test relays and their circuits prevents simultaneous operation of two test relays on one outlet. These testing arrangements may be provided in a common circuit coupled to the selecting switch when the demand arises.

If the testing arrangements are individual to the selecting switch the auxiliary relays may be the switching relays themselves. They may be provided with two windings one in the locking circuits for the test relays the other being connected to the holding wire in the usual manner. Alternatively, only one winding may be provided connected to a chain of contacts of the test relays in such a manner that it is operated by the operation of the corresponding test relay, steps being taken to guard against the operation of more than one switching relay should an earlier choice test relay operate before the locking circuit of a previously operated but later choice test relay is closed. This may be effected by arranging for a relay controlled by the locking contacts of the test relays to operate consequent on the operation of a test relay and disable the operating circuits of all the test relays.

By the provision of a marking bank cross connected to the bank of a digit switch associated with the selector either individually or in common and the use of a single motion selecting switch, the outlets of a group may be connected in any convenient position in the selecting switch bank. In order to reduce the number of cross connections and switch banks required it is desirable that the outlets of a multiple test belongs to the same group. Such an arrangement is especially suitable for use with high speed selecting switches such as that known as the motor uniselector. A switch of this type may carry up to sixteen wipers thus providing for the simultaneous testing of five outlets if only three wires are to be extended by the switch or a lesser number of outlets if more than three wires are to be extended.

Figure 2:
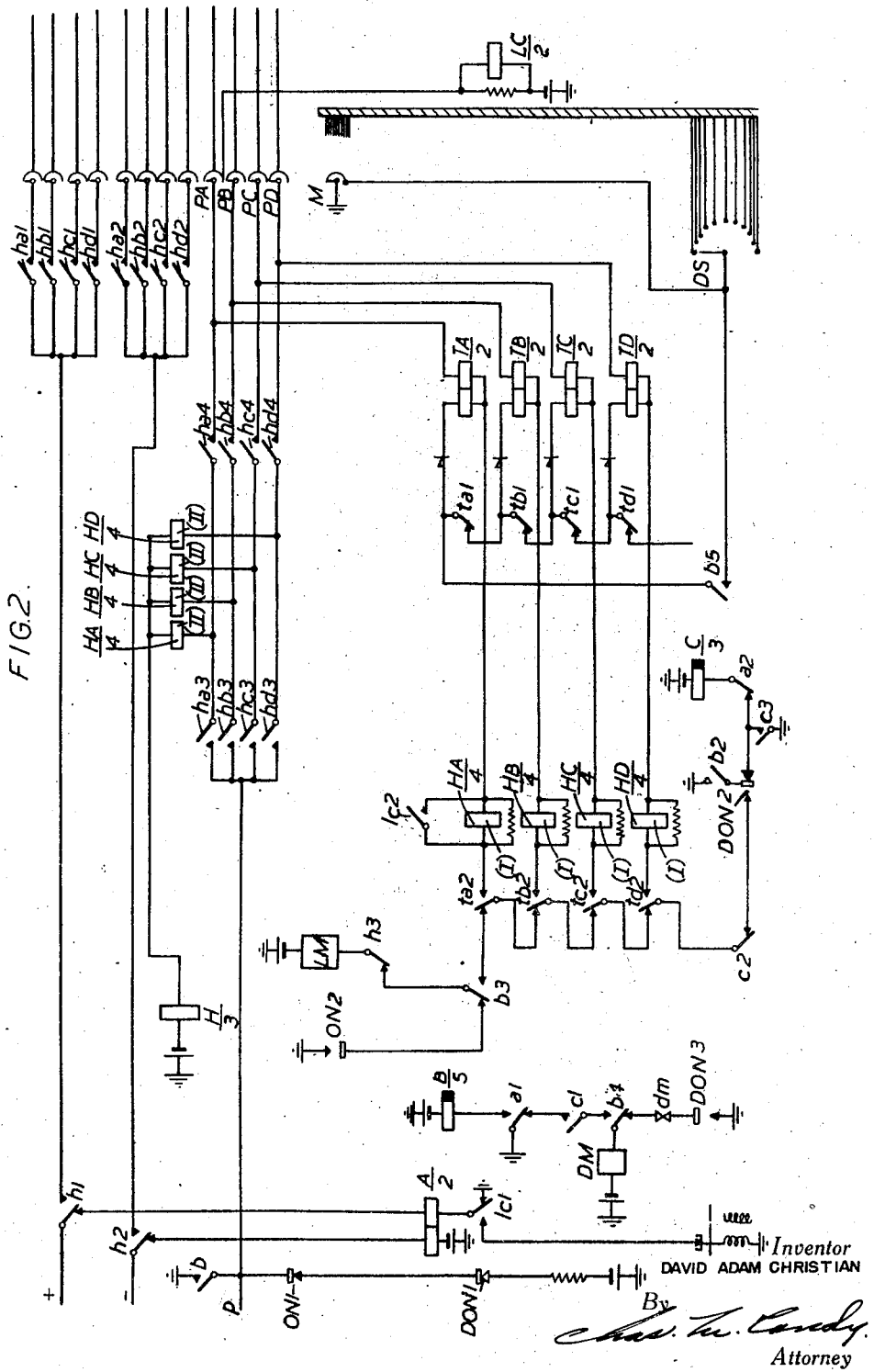

For the better understanding of the invention three embodiments will now be described by way of example with reference to the accompanying drawings. All the figures show circuit arrangements for a group selector in which four outlets are tested simultaneously and priority amongst a plurality of free outlets is given to these outlets designated by the earlier letter in the alphabet. Fig. 1 shows an arrangement in which the testing and the control of the selector is carried out in a common control circuit, auxiliary relays being connected in the locking circuits for the test relays. Figs. 2 and 3 show arrangements in which testing and control are vested in the individual selector. In Fig. 2 the place of the auxiliary relays is taken by additional windings of the switching relays and in Fig. 3 the switching relays are connected to the contact chain in the operating circuit for the test relays. In all the figures the group selector is of the motor driven high speed type in which a motor with unwound armature rotates the wipers, the energising windings of the motor being provided by two field magnets connected up alternately by means of contacts operated by a cam on the armature spindle, current being applied to the windings over contacts of a latch magnet which normally holds a latch in the teeth of a driven wheel, the operation of the magnet lifting the latch and connecting current to the field magnet windings and its de-energization disconnecting the field magnet circuit and inserting the latch into the teeth of said driven wheel. This mechanism is illustrated in the drawings by the latch magnet LM. The selecting switch GS has thirteen wipers, four connected to each of the speaking wires and four connected to the test wire and a single marking wiper. Each bank may contain 50 contacts. The four wipers connected to the test wires are designated PA, PB, PC and PD and in testing preference is given to the outlets connected to these wipers in the order mentioned. The marking wiper M is earthed. Off-normal contacts ON1 and ON2 are also provided, these contacts being operated when the wipers leave their normal position. The individual switching relays are designated HA, HB, HC and HD for the four outlets which are connected up simultaneously and H is a common switching relay. A ratchet driven switch for effecting the marking of the group to be searched has stepping magnet DM and a single wiper DS and off normal contacts DON1, DON2 and DON3. The test relays are designated TA, TB, TC and TD and are high speed relays and they are arranged to give priority in the order mentioned. Each relay has two windings, a high resistance (left hand) winding and a low resistance (right hand) locking winding. For testing, the two windings are connected in series, the relays being connected to a contact chain in which contacts of the earlier relays are in the operating circuit for later relays but not vice versa. For example contacts of relays TA, TB and TC are connected in the operating circuit for relay TD but the operating circuit for relay TA does not include contacts of any of the test relays, relay TA being connected to the beginning of the chain. A similar chain of contacts connected in the reverse order is connected in the locking circuits for the test relays, the low resistance winding of relay TD being connected to its own contact at the beginning of the chain, and contacts of relays TD, TB, TC and TA being connected in the locking circuit for relay TA. Impulses are received on relay A, relay B is the usual release relay which is of the slow releasing type and relay C is the usual slow releasing dialling relay. LC is a last contact relay connected to the last contacts in the bank of test wiper PA. The digit switch and all the relays mentioned following reference to the digit switch are, in Fig. 1 connected in a common control circuit. In Figs. 2 and 3 they form part of the individual switch circuits.

Detailed operation of the circuits shown in Fig. 1 will now be described. In this figure all the apparatus shown below the broken line is in the common control circuit and all apparatus shown above this line is individual to the selecting switch. All the connections between the common control and the individual switch with the exception of that from the incoming test wire $p$ over contact ON1 to contacts 2, 3, 4 and so on of relay JB are commoned to all the selecting switches served by the same common control circuit. The exception referred to is individual to the selecting switch, that for the selector shown being over contact $jb2$. The individual switch is also provided with a coupling relay K for completing circuits between the individual and common circuits. The test for a free selector also depends on the associated common control circuit being free and the free and available condition is denoted by battery potential on the incoming test wire $p$. This battery is connected over contacts DON1, $jb2$ and ON1 and a preceding switch, in its search, encountering this condition switches through the connection over its wipers and relay A operates over contacts $h1$ and $h2$ and a preceding loop. Contact $a1$ closes the circuit for relay B and contact $a2$ opens a point in the circuit for relay C. Relay B operates and at contact $b1$ connects relay K in the test-in circuit, the shunt across that relay being removed by the operation of relay JB at contact $b2$. Contact $b3$ closes a point in the circuit for relay C, contact $b4$ prepares an operating circuit for magnet DM of the digit switch and contact $b5$ connects wiper DS of the digit switch to the contact chain in the operating circuit for the test relays. Relay K operates and locks over contact $k1$ and at contact $k2$ earths the test wire $p$ to hold preceding switches in known manner. Contact $k3$ connects the latch magnet LM of the selector to the second contact chain of the test relays, contacts $k4$ to $k7$ connect up the switching relays to the common control circuit and contacts $k8$ to $k11$ connect the test relays to the test wipers. When relay JB operated it disconnected the test-in circuit over all the selectors served by the common control circuit and at contact $jb1$ closed a point in the second contact chain.

The impulses for marking the group to be searched by the group selector are received by relay A and on contact $a2$ falling back relay C operates in a circuit from earth over contacts DON3, $a2$ and $b3$. Contact $c1$ closes a circuit for magnet DM from earth over contact $a1$, contacts $c1$, $b4$, magnet DM to battery. The magnet operates. On the re-energisation of relay A the circuit for magnet DM is opened and the magnet releases, steps wiper DS to the first contact in its bank and the off-normal contacts are operated. Relay C is held while relay A is released over contact c3 and while relay A is energised it holds by reason of its slug. Further impulses, if any, are repeated to magnet DM to step the wiper DS to a contact indicative of the number of impulses received and at the end of the impulse train, relay A being steadily operated, relay C releases, A circuit is now closed over contacts DON3, c2, jb1, td2, tc2, tb2, ta2, k3 and h3 for magnet LM and the wipers of the selecting switch are set in motion in search of a free outlet in the marked group. Meanwhile contact DON1 has opened a further point in the test-in circuit and contact DON2 has closed a point in the homing circuit for the digit switch.

The test outlets of the group to be searched are marked over wiper DS and these outlets may appear anywhere in the test wire banks, it being necessary however, that all the outlets in corresponding positions in the banks belong to the same group. The test circuit is from earth over wiper M, bank wiring wiper DS, contact b5, one or more of the test relays and the corresponding test wipers to battery on a free outlet. Busy outlets will be marked by earth on the test wires. Let it be assumed that, of a group of four outlets with which connection is made simultaneously by the selector, that connected over wiper PA is free. Relay TA will accordingly operate in the test circuit traced and at contact ta1 will break the operating circuit for the other test relays and at contact ta2 will break the circuit for magnet LM to stop the selector and make a circuit over contacts DON3, c3, jb1, back contacts td2, tc2, tb2, front contact ta2, relay UA, locking winding of relay TA, contact k3, wiper PA to battery. Obviously the other test relays cannot operate even if the outlets to which they are connected are free as their circuits are opened at contact ta1. Relay UA which is of low resistance and is shunted by a non-inductive resistance operates in the above traced circuit. Contact ua1 closes a circuit from earth over contacts lc2 and k4 relay HA and relay H, to battery and the relays HA and H operate, the former switching the speaking and test wires through at contacts ha1, ha2, ha3 and ha4 and the latter extending the speaking wires over contacts h1 and h2 and cutting off relay A. Relays H and HA hold in series first over contacts ha3 and k2 and after the battery on the test outlet has been replaced by earth to mark the outlet busy, the holding circuit is to this earth over contact ha4 and wiper PA. Contact h3 opens the latch magnet circuit. Contact ON1 opens the test-in circuit and contact ON2 prepares the homing circuit. Consequent on the disconnection of relay A at contacts h1 and h2 that relay releases and initiates the slow release of relay B. Also, consequent on the extension of earth over contacts k2, ha3, ha4 and k3, relay TA is released followed shortly after by relay UA. On the release of relay B by the opening of contact a1, relay K is released at contact b1, thereby disconnecting the individual circuit from the common control circuit, release of relay JB is initiated at contact b2, the circuit for relay C is opened at contact b3, the homing circuit for the digit switch is closed at contact b4 over contact dm operated by the magnet DM and contact DON2, and the testing circuit is opened at contact b5. The digit switch homes and on the restoration of the off-normal contacts and the release of relay JB, it is re-associated with the individual switches.

At the end of the conversation, relays HA and H are released consequent upon the disconnection of earth from the test wire and at contact h3 a circuit over contacts ON2 and k3 is closed for magnet LM and the selector is driven forward until the normal position is reached whereupon the selector is stopped by the release of magnet LM on the opening of contacts ON2 and the test-in circuit is restored at contacts ON1.

If during the search no free outlet in the group is found, the selector is stopped in a last contact position by the operation of relay TA in series with relay LC. The opening of contact lc2 prevents operation of relays H and HA and the closure of contact lc1 applies busy tone over relay A and contacts h1 and h2 to the calling circuit. The selector is released when the caller clears by the release of relay K. Relay H being unoperated, a circuit for magnet LM is closed over contacts ON2, k3 and h3 and the selector is homed. Relays TA and LC are released following the release of relay K.

The operations will now be considered when an earlier choice outlet is busy but a later choice outlet of the plurality is free. Let it be assumed that the outlet from the bank of wiper PA is busy but the outlet from the bank of wiper PB is free. In this case relay TB will operate in the manner described earlier for relay TA and will lock up over relay UB and contacts tb2, tc2 and td2. If, while relay K is still operated the outlet from the bank of wiper PA should become free, relay TA can operate but it cannot lock because its locking circuit is open at contact tb2 and consequently relays UA and HA cannot operate. The operation of relay TA provided that the locking circuit of relay TB has already been closed cannot interfere with the latter relay in any way because once relay TB has been operated and its contact tb2 has been changed over no contact of relay TA is included in the locking circuit. If, however, relay TA should operate before contact tb2 makes its front contact, relay TB will be released at contact ta1 and the contact chain in the locking circuit for relay TA will be completed over the back of contact tb2 and the front of contact ta2. As before explained a later relay, e. g. relay TC cannot operate as contact tb1 has broken the chain in the testing circuit.

Similar operations take place if either of the other later outlets is free and relay TC or TD operates followed by UC or UD and HC or HD, the individual switching relay operated extending the connection to the selected outlet.

The arrangement shown in Fig. 2 is similar to that shown in Fig. 1, but all the circuits are individual to the selecting switch shown. In place of the relays UA a second winding of the individual switching relays is connected up, shunted, as was relay UA, by a non-inductive resistance. The test relays and the contact chains are arranged exactly as those shown in Fig. 1. The switch tests free by the presence of battery on the incoming test wire p over off-normal contacts DON1 and ON1 of the digit switch and selector respectively and when it is seized, relays A and B are operated. Contact b1 earths the wire p to mark the switch engaged, contact b2 prepares an operating circuit for relay C at present open at contact a2, contact b3 prepares a circuit for the latch magnet LM of the selector, contact b4 prepares the circuit for the digit switch magnet DM and contact b5 closes in the testing circuit. The impulses denoting the group to be searched are received by relay A and repeated to magnet DM and relay C is operated exactly as described for Fig. 1. At the end of the impulse train, relay C releases and at contact $c2$ closes a circuit from earth over contacts $b2$, DON2, $c2$, contacts 2 of the four test relays, contacts $b3$ and $h3$, magnet LM to battery. The magnet operates and drives the selector wipers in search of a free outlet in the group marked over wiper DS of the digit switch. Testing takes place in the manner previously described and on the operation of a test relay the selector is stopped and a locking circuit is closed over contacts $b2$, DON2, $c2$, back contacts 2 of the later unoperated test relays, front contact 2 of the operated test relay, low resistance winding (I) of the relevant switching relay, low resistance locking winding of the operated test relay, the relevant test wiper to battery on the test wire of the outlet. The switching relay operates in this circuit and connects itself over its winding (II) in series with its contact 3 and relay H to the earthed test wire. Relay H operates and the connection is switched through to the outlet and relay H and the individual switching relay are connected to the relevant test wiper over contact 4 of the individual switching relay. Consequent on seizure of the outlet earth is connected in the seized circuit to the test wire by means of which relay H and the individual switching relay and preceding switches are held and the outlet busied. Operation of relay H releases relay A which in turn releases relay B and the digit switch is homed in the manner previously described.

At the end of the call when the connection is cleared, earth is disconnected from the test wire, releasing relay H and the switching relay. Contact $h3$ falling back closes the homing circuit for the selector which is then restored to normal.

The priority of selection of the outlets and their seizure is arranged exactly as described for Fig. 1. In the event of an unsuccessful search, the selector is stopped in its last contact position by the operation of relay TA in series with relay LC connected to the last contact in the bank of wiper PA. Relay LC operates and at contact $lc2$ short circuits winding (I) of relay HA preventing operation of that relay and relay H and at contact $lc1$ a busy tone is applied over relay A to the calling line. The last contacts in the speaking wire banks are not connected.

The arrangements shown in Fig. 3 are somewhat similar to those already described but in this case the individual switching relays have each only a single winding connected for operation over front contacts of the chain in the operating circuits for the test relays. The contacts of the second contact chain, besides being included in the circuit for the selector latch magnet LM, in their unoperated condition bridge relay E, contacts of which are included in the operating circuits of the test relays.

The operation of the circuit up to the testing of a plurality of outlets connected up to the test relays by the test wipers is as described for Fig. 2. A second winding of relay C is however connected in the circuit of magnet DM to hold the relay during impulsing. When a test relay operates, it opens the operating circuit for later choice test relays at its back contact 1 and prepares an operating circuit for the corresponding switching relay. At its contact 2 it closes its locking circuit and removes the short-circuit from relay E which operates in series with magnet LM. The resistance of this circuit is too high for magnet LM to hold and it releases stopping the selector. Contact $e5$ opens to prevent the short-circuit across relay E being re-imposed when the test relay releases, contact $e6$ operates relay H over its upper winding and contact $e1$ to $e4$ open in the operating circuits for the test relays. Relay H connects the individual switching relays to the front contacts of the first contact chain and the switching relay so connected to the operated contact of the test relay in the first contact chain operates in series with the lower winding of relay H. The individual switching relay extends the connection over operated contacts of relay H to the switch wipers and locks up in series with relay H to the test wire, first over its contact 3 and contact $b1$ and later over its contact 4 and the test wiper to the earth applied to the test wire of the outlet to busy it. When the individual switching relay operates, earth on the test wire short-circuits the operated test relay thereby releasing it.

If the search is unsuccessful, relay TA operates in series with relay LC over the last contact in the bank of wiper PA and switching relay HA is operated. The last contacts in the bank of wipers HA1 and HA2 are connected to relay A to hold it in these circumstances and contact $lc1$ connects a busy tone transformer to a third winding on relay A over which the tone is repeated over the wipers HA1 and HA2 and contacts $h1$ and $h2$ to the calling line. Release of the connection takes place in the manner previously described. In this arrangement earlier choice test relays than that which succeeds in closing its locking circuit cannot operate their associated switching relays because by the time contacts $h4$ to $h7$ are closed the said test relays have been released by the opening of their operating circuits at contacts of relay E.

I claim:

1. In a selecting switch, a plurality of outlets, a plurality of test relays one for each outlet for simultaneously testing said outlets, each having an operating and a locking circuit, a chain circuit extending through contacts of said relays so that the operating circuits of later choice relays pass through contacts on the earlier choice relays only, a further chain of contacts connecting the locking circuits in reverse order through contacts on said relays, each relay, when operated, preventing operation of later choice test relays, and each relay, when its locking circuit is closed, preventing any control by an earlier choice relay.

2. A selecting switch as claimed in claim 1 having a series of switching relays for seizing an available outlet, and a series of auxiliary relays connected in the locking circuits of said test relays for controlling the proper switching relay.

3. In a selecting switch, a plurality of outlets, means for simultaneously testing said outlets including a plurality of test relays each having an operating circuit including a test conductor of an outlet and a locking circuit, contacts on each relay controlling the operating circuit of later choice test relays giving a preference of operation, and other contacts of said relays controlling the locking circuits thereof, each of said last contacts controlling its own locking circuit and also controlling the locking circuits of all earlier choice test relays, whereby an earlier choice relay can only prevent operation of a later choice relay before its locking contacts have operated.

4. A selecting switch such as claimed in claim 3 in which there is an operating magnet controlling the hunting operation of the switch, and a circuit for said magnet including the chain of locking contacts of said test relays.

5. In a selecting switch, a plurality of outlets accessible to the wipers thereof, test contacts for each outlet, a digital switch for marking a group of said contacts, a plurality of test relays in the switch, one for each outlet in the marked group, means for connecting the relays simultaneously to the marked test contacts, operating circuits for each relay extending through contacts of the earlier choice relays to provide a preference of operation thereof and locking contacts for each relay extending through contacts of the later choice relays only, said locking contacts of each relay causing the switch to seize the associated outlet and preventing interference by an earlier choice relay.

6. A single motion selecting switch having a plurality of sets of wipers and a series of groups of outlets accessible thereto, an operating magnet, means for marking a group of outlets and causing the magnet to control the movement of the wipers to the marked group of outlets, a series of test relays connected to test contacts of said group of outlets when the wipers are so moved, said relays interconnected by means of chain contacts so that there is an order of preference in selecting one of the outlets due to a test relay preventing operation of later choice test relays and means for preventing an earlier choice relay from interfering with the operation of a later choice relay after the later choice relay has operated.

DAVID ADAM CHRISTIAN.

REFERENCES CITED

The following references are of record in the file of this patent:

UNITED STATES PATENTS

| Number | Name | Date |
| --- | --- | --- |
| 1,922,192 | Bellamy | Aug. 15, 1933 |
| 2,137,423 | Taylor | Nov. 22, 1938 |